(12) United States Patent
May et al.

(10) Patent No.: US 12,705,690 B2
(45) Date of Patent: Aug. 11, 2026

(54) TRAINING METHOD, DEVICE AND IMAGE REPRESENTATION SYSTEM FOR IMAGE STITCHING

(71) Applicant: KONINKLIJKE PHILIPS N.V., Eindhoven (NL)

(72) Inventors: Jan Marek May, Moscow (RU); Johannes Koepnick, Neumünster (DE); Bernd Lundt, Flintbek (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/865,807

(22) PCT Filed: Feb. 6, 2024

(86) PCT No.: PCT/EP2024/052822
§ 371 (c)(1),
(2) Date: Nov. 14, 2024

(87) PCT Pub. No.: WO2024/175340
PCT Pub. Date: Aug. 29, 2024

(65) Prior Publication Data
US 2025/0371765 A1 Dec. 4, 2025

(30) Foreign Application Priority Data
Feb. 20, 2023 (EP) .................................... 23157474

(51) Int. Cl.
*G06T 11/60* (2026.01)
*G06V 10/74* (2022.01)
(Continued)

(52) U.S. Cl.
CPC ............ *G06T 11/60* (2013.01); *G06V 10/761* (2022.01); *G06V 10/774* (2022.01); *G06V 10/82* (2022.01); *G06T 2210/41* (2013.01)

(58) Field of Classification Search
CPC ... G06T 11/60; G06T 2210/41; G06V 10/761; G06V 10/774; G06V 10/82
See application file for complete search history.

(56) References Cited

U.S. PATENT DOCUMENTS 10,032,256 B1 7/2018 Anaya
11,875,490 B2 * 1/2024 Lee .......................... G06T 5/50
(Continued)

FOREIGN PATENT DOCUMENTS

CN 101499166 A 8/2009
CN 109977978 A 7/2019
(Continued)

OTHER PUBLICATIONS

Mohammad Emtiyaz Khan, "Cost Functions", Sep. 17, 2015 (Year: 2015).*
(Continued)

*Primary Examiner* — Aaron W Carter
(74) *Attorney, Agent, or Firm* — Larry Liberchuk

(57) ABSTRACT

The invention concerns an image processing system configured for carrying out a computer-implemented method for generating a stitched image with a convolutional neural network (208), a computer-implemented method for generating a stitched image with a convolutional neural network, and a method of training a convolutional neural network, for determining an image representation for image stitching. The training of the convolutional neural network comprises receiving image data, wherein the image data comprises at least two images (101, 102), overlapping each other in an overlapping area (103, 203) in which the images overlapping each other in a target anatomy (104), and wherein the overlapping area comprises an optimum displacement between the two images such that the two images can be correctly combined for image stitching, determining a cost function (105, 205) of the displacement of the two images in
(Continued)

the overlapping area, determining a deviation of the cost function from a reference cost function, and optimizing the CNN based on the deviation.

14 Claims, 2 Drawing Sheets

(51) Int. Cl.
*G06V 10/774* (2022.01)
*G06V 10/82* (2022.01)

(56) References Cited

U.S. PATENT DOCUMENTS

| | | | | |
|---|---|---|---|---|
| 12,260,620 | B2 | 3/2025 | Kraus | |
| 2006/0018527 | A1 | 1/2006 | Bojer | |
| 2017/0337682 | A1* | 11/2017 | Liao | G06T 7/30 |
| 2019/0286921 | A1* | 9/2019 | Liang | G06F 16/909 |
| 2021/0065393 | A1* | 3/2021 | Jeon | G06N 3/0455 |
| 2021/0158549 | A1* | 5/2021 | Veeravasarapu | G06T 7/30 |
| 2021/0383565 | A1* | 12/2021 | Le | G06N 3/09 |
| 2021/0397886 | A1* | 12/2021 | Chen | G06N 3/0475 |
| 2023/0169666 | A1* | 6/2023 | Pati | A61B 6/5241 382/132 |
| 2023/0237661 | A1* | 7/2023 | Hsiao | G06N 3/08 382/128 |
| 2024/0144663 | A1* | 5/2024 | Hua | G06V 10/82 |
| 2025/0086933 | A1* | 3/2025 | Moser | G06F 18/22 |

FOREIGN PATENT DOCUMENTS

| | | | | |
|---|---|---|---|---|
| CN | 111047513 | A | 4/2020 | |
| EP | 2555156 | A1 | 2/2013 | |
| EP | 3726457 | A1 | 10/2020 | |
| EP | 4418198 | A1 * | 8/2024 | G06N 3/09 |
| WO | WO2022182293 | A1 | 9/2022 | |

OTHER PUBLICATIONS

PCT International Search Report, International application No. PCT/EP2024/052822, May 28, 2024.

Chilukuri P.K. et al., “I, r-Stitch Unit: Encoder-Decoder-CNN Based Image-Mosaicing Mechanism for Stitching Non-Homogeneous Image Sequences”, IEEE Access, IEEE, USA, vol. 9, Jan. 18, 2021, pp. 16761-16782, XP011834799.

Levin A. et al., “Seamless Image Stitching in the Gradient Domain”, Computer Vision—ECCV 2004; [Lecture Notes in Computer Science;;LNCS], Springer-Verlag, Berlin/Heidelberg, pp. 377-389, Apr. 16, 2004 , XP019005934.

Schock J. et al., “Automated Analysis of Alignment in Long-Leg Radiographs by Using a Fully Automated Support System Based on Artificial Intelligence”, Radiology: Artificial Intelligence, vol. 3, No. 2, 2021. Published Online: Dec. 23, 2020.

* cited by examiner

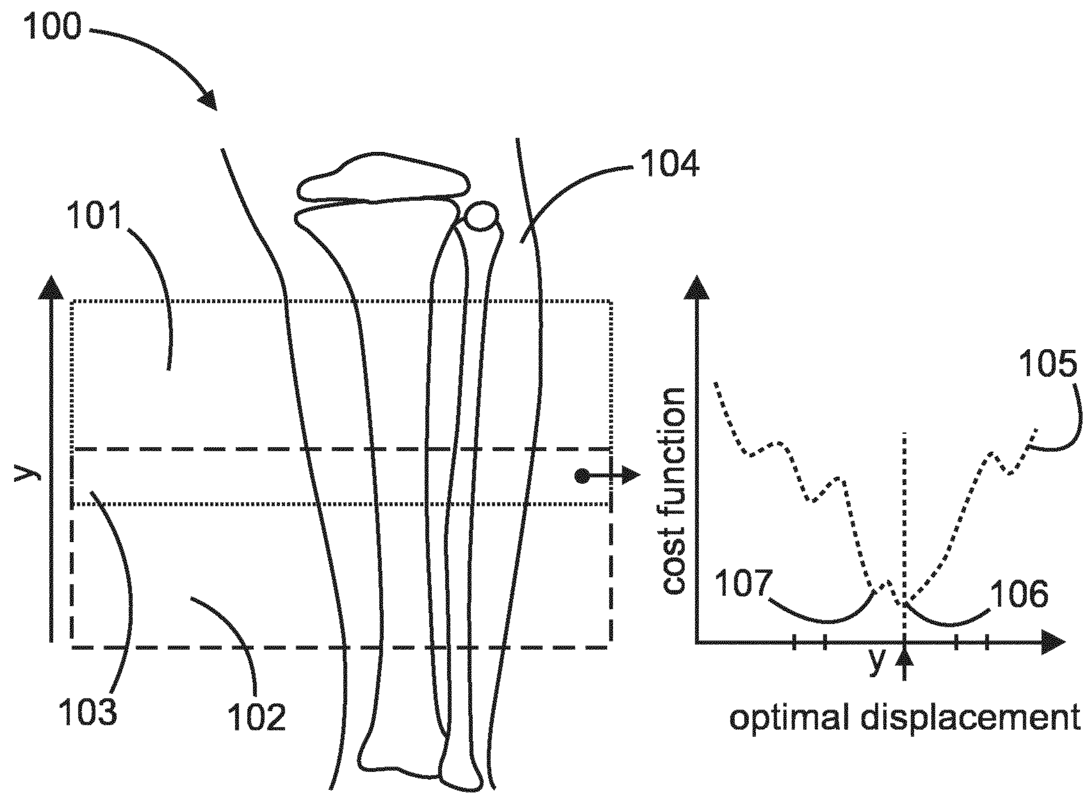
FIG. 1 State of the Art
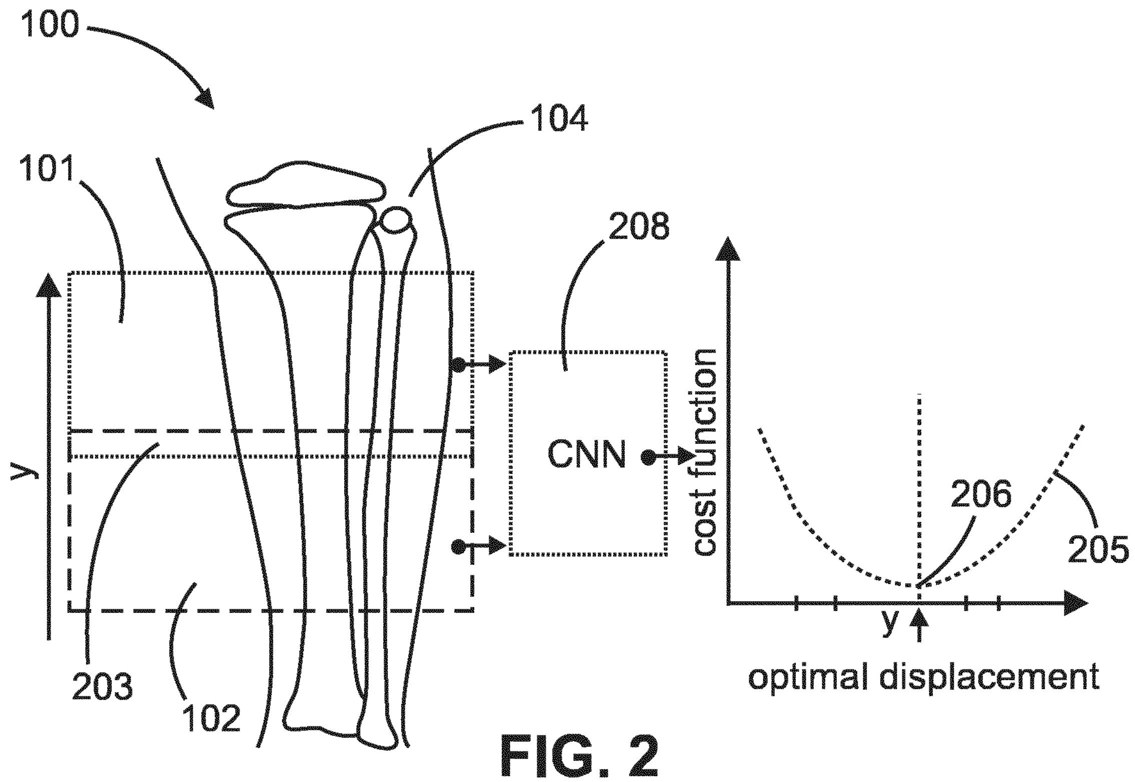
FIG. 2

TRAINING METHOD, DEVICE AND IMAGE REPRESENTATION SYSTEM FOR IMAGE STITCHING

FIELD OF THE INVENTION

The invention relates to the field of image processing, in particular to the field of image stitching. More specifically, the invention relates to the field of an image processing system configured for carrying out a computer-implemented method for generating an image representation based on image stitching with a neural network, a computer-implemented method for generating an image representation based on image stitching with a neural network, and a method of training a neural network, for an image representation for image stitching.

BACKGROUND OF THE INVENTION

Image representation based on image stitching is a technique in, for example, X-ray imaging to create an image of anatomies larger than the detector size. Commonly, overlapping X-ray images of the anatomy are required, in particular from a respective target anatomy, which should be analyzed based on the stitched image. The images, which could be described as adjacent, are aligned and blended by an image processing algorithm to obtain one image of the entire target anatomy.

Classical image processing algorithms commonly estimate the expected displacement between two adjacent images by similarity measures. The similarity measures are computed on overlapping areas present in two adjacent images, wherein the similarity measures are directly computed based on, for example, overlapping X-ray images. The overlapping area is exposed twice, for each adjacent image pair, which are combined during stitching; this leads to a higher dose for a patient. Large overlapping areas result in a more reliable stitching process, while they also increase the patient dose. Contrary, small overlapping areas reduce the patient dose but make the stitching process less reliable. These metrics, the similarity measures, are prone to local maxima or minima, which might be caused by noise or parallax errors. These local extrema of the similarity measures might result in inaccurate stitching result or even in failures of the entire stitching procedure.

WO2022/182293A1 describes a method of image stitching including generating a first stitched image based on a plurality of input images and based on an image domain stitching process.

Chilukuri et al.: "I, r-Stitch Unit: Encoder-Decoder-CNN Based ImageMosaicing Mechanism for Stitching Non-Homogeneous Image Sequences", IEEE Access, IEEE, USA, vol. 9, 18 Jan. 2021, pages 16761-16782 describe a robust and reliable image stitching methodology based on a novel convolutional-encoder-decoder deep-neural-network.

EP3726457A1 describes a system and a method for stitching images using non-linear optimization and multi-constraint cost function minimization.

EP2555156A1 describes a method implemented by an electronic device for image mosaicing.

Levin et al.: "Seamless Image Stitching in the Gradient Domain", 16 Apr. 2004, Computer Vision—ECCV 2004; [Lecture Notes in Computer Science;LNCS], Springer-Verlag, Berlin/Heidelberg, pages 377-389, describe image stitching which is used to combine several individual images having some overlap into a composite image by using cost functions.

SUMMARY OF THE INVENTION

Therefore, there exist a need for optimizing the quality of an image stitching process, in particular a need for optimizing the quality of an image representation based on image stitching. In particular, there exists a need to improve the image stitching process, and to avoid inaccurate stitching results or failures of the entire stitching procedure.

An object of the invention is to provide a method for training, a method for generating an image representation based on the method for training, and a system for image representation, wherein the failure of similarity measures can be reduced, and the stitching result can be improved and is less prone to failures due to similarity measures.

The object of the present invention is solved with the subject matter of the independent claims, wherein further embodiments are incorporated in the dependent claims.

According to a first aspect of the invention, a method of training a convolutional neural network (CNN) for determining an image representation for image stitching is described. The method comprises the following steps of: receiving image data, wherein the image data comprises at least two images, overlapping each other in an overlapping area in which the images overlapping each other in a target anatomy, wherein the overlapping area comprises an optimum displacement between the two images such that the two images can be correctly combined for image stitching. The method may further comprise the steps of determining a cost function of the displacement of the two images in the overlapping area, determining a deviation of the cost function from a reference cost function, and optimizing the CNN based on the deviation.

In the context of the present invention, the term "image representation" shall be understood to describe the illustration, display of at least one image, or more than one image. In particular, the term "image representation shall be understood to describe as the result of applying a non-linear transformation to a pair of X-ray images. The non-linear transformation may be learned from data by training a CNN. In other words, these images may be generated using an image stitching method, in particular the image stitching method using the training method of a CNN as described herein. The image representation may be for example an X-ray image representation of an image generated from a patient, in particular from a specific target anatomy, which should be analyzed. The image generated from a patient, which is represented, may be beforehand processed according to any of the methods for training, and/or according to the computer-implemented method of generating an image representation in an image representation system as described herein.

In the context of the present invention, the term "image stitching" or "stitching" shall be understood to describe a method or a process of combining at least two or more images for generating one new image, wherein the term image stitching may be used for standard stitching procedures or for image stitching procedure using the method, systems and elements according to an embodiment as described herein. In particular, for a stitching of images, at least two images, wherein the images overlap in a certain area, which area the images have in common. The image stitching is used for providing so-called seamless results of the combined image.

In the context of the present invention, the term "overlapping area" shall be understood to describe an area, which is comprised in the images to be stitched, for example in at least two images. In other words, at least two images, which should undergo a stitching process, are generated from a patient, for example of a leg. The first image may be taken from the knee to the middle of the lower calf, the second images may be taken from the foot to the middle of the lower calf. Both images comprise the same image information in the area of the middle of the lower calf and different image information corresponding to the knee (first image) and the foot (second image). The overlapping area is the area in which the image information, and/or both displayed images comprise the same and/or similar image information. A size of the overlapping area depends inter alia on the size of the respective single image itself, from a movement of the image processing system, and/or from a movement of the image device used for generating the image.

In the context of the present invention, the term "target anatomy" shall be understood to describe for example the part of the body, which should be examined by a medical person for medical treatment etc. This target anatomy could be any body part of a patient, for instance, a leg, a foot, an arm, a chest, a head and so on. For investigation of the target anatomy an image may be generated, at least two images may be generated which images comprise the target anatomy.

In the context of the present invention, the term "optimal displacement" shall be understood to describe an arrangement of the for example at least two images, such that a combined image does not comprise any stitching failures, and/or overlap/overlay failures. Hence, a seamless result of the combined image should be achieved, which requires a nearly exact overlap between the images and almost, nearly identical exposures for producing an optimal displacement. In particular, the CNN is trained with for example, an overlapping image pair, wherein the corresponding displacement between them is the optimum, correct displacement. The displacement is the true shift between both images such that they can be correctly stitched. Accordingly, the CNN is trained to predict the optimum displacement for unknown images, even for images having a small overlapping area. The CNN may be able to transform the image to the new image representation. The optimal displacement may be determined based on this new representation using a similarity measure as will be described with further embodiments of the invention.

In other words, with the described method a neural network, in particular a convolutional neural network may be trained with respective optimal input parameters, such that the trained CNN is able to determine, predict the optimum displacement during the real-time application. In particular, to learn an image representation which is more suitable for image stitching. Accordingly, a data-driven approach is described, where a CNN is trained to learn a representation of an image, which represents the entire anatomy visible in the input images. The result of the method may be a smooth cost function with a pronounced minimum to determine the optimal displacement, and/or shift for image stitching.

The training method allows reducing the overlapping area and hence the patient dose, for example when the trained neural network is applied in a computer-implemented method for image representation based on image stitching and in a system using this method. In particular, the overlapping area can be reduced and can be as small as possible, because the proposed method (for training the CNN) is able to determine the optimum displacement even from small overlapping areas, and the stitching process using the trained CNN is free of ambiguities of the cost function. Further, when using the trained method in an imaging system, as will be described in further embodiments herein, the improved image representation method allows to ease the image stitching process, as for example, a so called stitching ruler, which is a ruler made of X-ray absorbing material, can be omitted, such that the workflow is enhanced.

The training of the neural network allows avoiding false global minima in the cost function, which results in a reduced stitching failure rate. The input images to the CNN are for example two entire images and not only the overlapping area. Therefore, the CNN may be able to consider all anatomical features from the entire input images, which in turn allows reducing the overlapping area and hence the X-ray exposure to the patient is reduced. Further, the CNN may be able to reduce the failure rate especially for elongated anatomical structures such as legs, which can result in incorrect displacements due to ambiguities in the cost function if classical techniques are used.

The described training method and its applications in the computer implemented method and the image representation system may be used in the field of X-ray, radiography, fluoroscopy, orthopedic, skeletal radiography and is not limited to any specific medical imaging.

According to an exemplary embodiment of the invention, the step of optimizing the CNN may comprise optimizing at least one parameter of the CNN, for example, a filter kernel may be optimized. Alternatively or additionally the optimizing of the CNN may comprise optimizing more than one parameter or all parameters, for instance, all filter kernels are optimized. Optimizing the CNN may comprise determine the optimum weights of the CNN.

According to an exemplary embodiment of the invention, the method may further comprise the step of penalizing deviations from the reference cost function. This step may be used for training, optimizing the CNN, in particular the parameters of the CNN, like a filter kernel and/or a plurality of filter kernels.

In other words, penalizing of the deviation may be described that the CNN may reward these cost function, which meet the reference cost function. Hence, the CNN may learn while training an image representation which results in the reference cost function. For rewarding the respective cost function, a deviation of the displacement from the reference cost function may be determined, wherein the reward may be greater when the deviation meets the reference cost function.

According to an exemplary embodiment of the invention, the steps of determining the cost function, determining the deviation of the cost function from the reference cost function, and optimizing the CNN may be repeated until the cost function meets the reference cost function.

Accordingly, several iteration steps may be required before the cost function meets the reference function. According to an exemplary embodiment of the invention, the image data may be obtained from clinical stitching sequences having annotated correct displacements and/or from artificially constructed image data with known displacement. The CNN may be trained on clinical image data to produce optimum cost functions with a global extremum at the position of the optimal displacement between, for instance, two X-ray images. As the CNN can consider anatomical features from the entire images, which are inputted, it also may allow reducing the overlapping area and hence an X-ray exposure to the patient is reduced.

The image data comprising annotated correct displacements, may be understood as image data, wherein the correct displacement is known. For instance, clinical personnel, and/or medical persons may have annotated the pictures for determining the correct displacement. Hence, the annotations may be manual annotations, which may refer to higher costs due to the required personnel. On the other hand, this may have the advantage that real noise and parallax errors are present in the images, and this is included in the training method, such that the CNN is trained with images from real circumstances.

The other image data based on artificially constructed/generated image data with known displacement may be understood to describe a use of clinical images, which are augmented. An augmentation may describe that the images are modified with for example artificial noise, perspective distortion or contrast stretching and/or compressing, wherein these examples are not limiting. Accordingly, the image date may comprise two images with the same content but different appearance. The two overlapping areas of the same size may be cropped-one from both images. As it is known how the overlapping areas overlap, the true displacement is known. This method may be used to artificially generate image pairs with known displacements. This approach may be cheaper, may be automated, and may avoid the cost for manual image annotation. Both approaches of the determination of the image data for training may be combined during training.

According to an exemplary embodiment of the invention, the step of determining the cost function of the displacement of the two images may comprises applying a similarity measure to a plurality of displacements between the two images.

The similarity measure may be applied to more than one displacement of the two input images. The only limitation to the definition of such a similarity measure may be that the similarity measure is differentiable because it is part of the training process where all operation may be, should be, or in particular need to be, differentiable. The output of the similarity measure applied to a plurality of displacements may be the cost function. The minimization, hence, the determination of the minimal cost value, leads to the displacement, which maximize the similarity in the overlapping area. In ideal images, the overlapping images would be identical in the overlapping area. To determine the optimum displacement, one might only need to minimize the cost function. However, in practice parallax errors and noise disturb this minimization process and this may result in an incorrect displacement. The similarity measure is applied for a plurality of displacements, for finding the optimum displacement. As the similarity measure may be differentiable, it may be possible to back propagate the gradients of the loss through similarity measure und to optimize the parameter of the CNN. Accordingly, the trained CNN may be able to predict the new images to which the similarity measure is applied to determine the optimal displacement.

According to an exemplary embodiment of the invention, the step of applying the similarity measure may comprise determining the similarity of the overlapping area for possible displacements. In particular, the similarity measure determines, computes, the similarity of every possible displacement. In the context of the present invention, the term "possible displacement" shall be understood to describe, the displacements, which could be found in the image, wherein not the whole images are overlaid with each other, but just only the relevant overlapping area. For instance, the overlap may depend on the imaging system settings for collimation and movement. A further example for the possible displacements may be the number of displacements between zero displacements and the maximum image width. For instance, if the image has a size of 2400 mm (length)×1800 mm (width), then the possible displacement may be in a range of 0 to 1800 mm. Another example, if the image has a size of 400 mm×120 mm, then the possible displacement may be in the range of 0 to 120 mm. It should be noted that if a displacement is zero, the images may be identical. Furthermore, the displacement may also be influenced by the geometry of the imaging system, and/or the movement of the imaging system. Therefore, if the movement of the imaging system is known with some uncertainty a range of possible displacements can be defined depending on the uncertainty. For example if the movement of the system is to be known in the range 60 mm to 100 mm this range also defines the range of possible displacements.

According to an exemplary embodiment of the invention, the step of applying the similarity measure may comprise generating a cost value for each of the pluralities of displacements, wherein the cost function is generated from the cost values of the plurality of displacements. Accordingly, a distribution, a course, or a trend of the cost value at the different displacements results in the cost function. For every of the plurality of the displacements a cost value may be generated, determined. A possible illustration of the course of the cost function is described in FIG. 2.

According to an exemplary embodiment of the invention, the reference cost function may be a convex cost function. The ideal cost function may be parabola with its minimum at the true displacement, hence a convex cost function. Therefore, the reference cost function is a convex cost function, wherein the deviation from this convex cost function may be determined. In view with the step of penalizing deviations from the reference cost function, the deviation which do not match, meet the convex cost function may be penalized.

According to an exemplary embodiment of the invention, a minimum of the cost function may correspond to the optimum displacement of the two images. Accordingly, the training method may be able to determine the optimum displacement, when the cost function is determined and in particular, when the cost function meets the convex cost function, because a convex cost function does only comprise one minimum. Therefore, the failure rates could be minimized by the new image representation of the CNN, which may avoid local extrema in the cost function.

According to an exemplary embodiment of the invention, the similarity measure may comprise at least one of a normalized cross-correlation, a zero mean normalized cross-function, a sum of absolute differences, or a sum of squared differences. The similarity measure may not be limited to these explicitly mentioned similarity measures, other similarity measures known for the skilled person may also be applicable. These above mentioned similarity measures are applied and the respective output may be the cost value, wherein form a plurality of cost value corresponding to respective displacements a cost function can be generated.

According to a second aspect of the invention, a computer-implemented method for generating a stitched image with a convolutional neural network (CNN) is described. The method comprises the following steps of: receiving an input dataset comprising at least two images, wherein the at least two images comprise an overlapping area in which the images overlapping each other in a target anatomy; processing the input dataset using the CNN trained using a method according to any one of the embodiment described herein, producing an output dataset from the CNN comprising at least two output images, applying a stitching algorithm to the at least two output images of the CNN, determining optimum displacement using the stitching algorithm, and generating a composite image, i.e. the stitched image, based on the determined optimum displacement and the input images.

With the described computer-implemented method an image representation may be computed/calculated more suitable for image stitching based on a neural network. In other words, a pair of images, for instance X-ray images, are processed by the CNN architecture, which outputs a pair of images. Hence, the output data set may be comprised of the at least two images, which are transformed to the new image representation, including at least all image information from the input images. The output images may have the same size as the input images. If less accuracy is required and computational time may be limited lower resolutions may be used to reduce computational time and hence reduce the size the of the output images. As the stitching algorithm uses the output dataset of the CNN the optimum displacement is easily determined, because the output dataset of the CNN comprises an image representation, which results in a convex shaped cost function. Therefore, the computer-implemented method is able to generate the composite image, i.e. the stitched image, with the optimum displacement.

According to an exemplary embodiment of the invention, the step of processing the input data set may comprise the step of applying at least one trained filter kernel. The CNN consist of filter kernels, which may be optimized during the training method as described in any one of the embodiment's hereinabove.

According to a third aspect of the invention, an image processing system is described, which is configured for carrying out the computer implemented method for generating an image representation as described herein. The system comprising at least one processor configured to receive an input dataset comprising at least two images, wherein the at least two images comprise an overlapping area in which the images overlapping each other in a target anatomy. The processor may further be configured to process the input dataset using the CNN, produce an output dataset from the CNN comprising at least two output images, apply a stitching algorithm to the at least two output images of the CNN, determine an optimum displacement using the stitching algorithm, generate a composite image, i.e. a stitched image, based on the determined optimum displacement and the input images.

The image processing system may further comprise a user interface configured to receive the output dataset from the processing system and configured to display the processing results, for instance a combined image to a user.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing may implement one or more of the methods or functionalities as described herein, and a processor described herein may be used to support a virtual processing environment.

According to a third aspect of the invention, a computer program comprising instructions is described, which, when the program is executed by a computer, cause the computer to carry out the method of any one of the embodiments as described herein above. In detail, the program may cause the computer to carry out the method for training the CNN as described with any one of the embodiments herein. Further, the program may additionally and/or separately cause the computer to carry out the computer-implemented method for generating an image representation as described according any of the embodiments herein.

The computer program element may be part of a computer program, but it can also be an entire program by itself. For example, the computer program element may be used to update an already existing computer program to get to the present invention.

The program element may be stored on a computer readable medium. The computer readable medium may be seen as a storage medium, such as for example, a USB stick, a CD, a DVD, a data storage device, a hard disk, or any other medium on which a program element as described above can be stored.

According to a fourth aspect of the invention, A computer-readable medium comprising instructions which, when executed by a computer, cause the computer to carry out the method of any one of the embodiments as described herein. In detail, the computer-readable medium may cause the computer to carry out the method for training the CNN as described with any one of the embodiments herein. Further, the computer-readable medium may additionally and/or separately cause the computer to carry out the computer-implemented method for generating an image representation as described with any of the embodiments.

It has to be noted that embodiments of the invention have been described with reference to different subject matters. In particular, some embodiments have been described with reference to system, computer program type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the system type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

FIG. 1 illustrates an image stitching process according to the state of the art.

FIG. 2 illustrates an image stitching process according to an embodiment of the present invention.

DETAILED DESCRIPTION OF EMBODIMENTS

Figure 3:
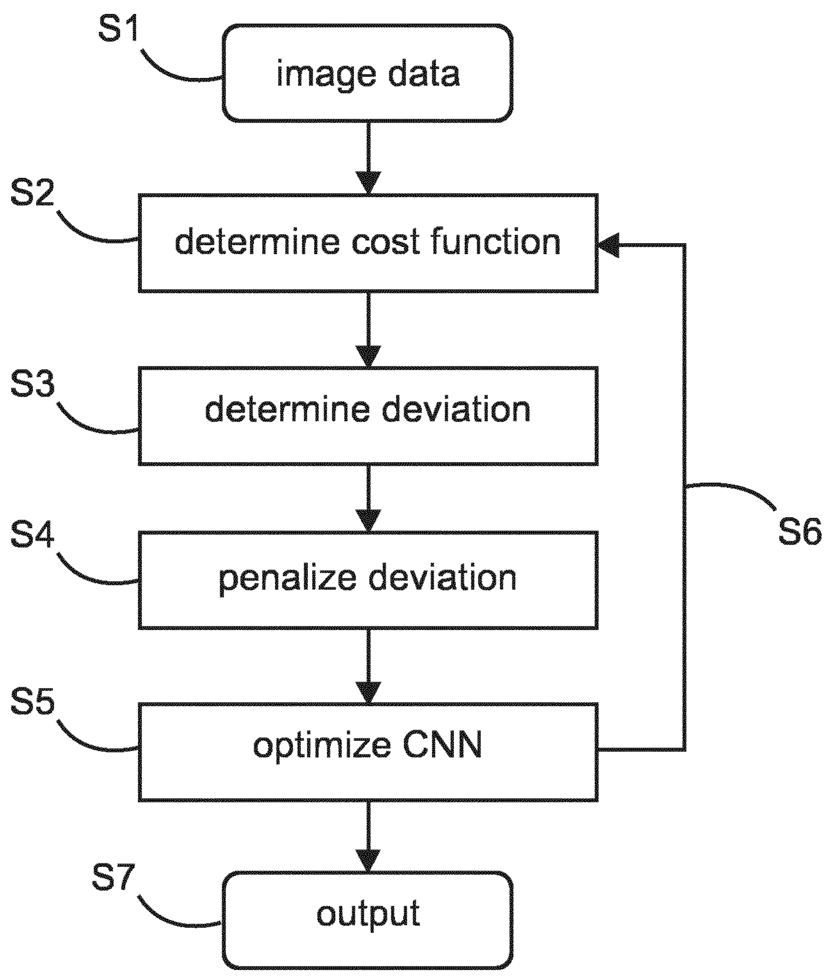
FIG. 3 illustrates a flow diagram illustrating method steps according to an embodiment of the invention.

The illustrations in the drawings are schematic. It is noted that in different figures similar or identical elements are provided with the same reference signs.

FIG. 1 illustrates an image stitching process according to the state of the art. FIG. 1 shows the overlap 103 of two images, the first image 101 and the second image 102. The images may be generated from a target anatomy 104, which in FIG. 1 is a part of a leg. The stitching algorithm estimates the expected displacement using similarity measures and outputs a cost function 105. As can be seen in the diagram of FIG. 1, the course of the cost function (x-axis) is displaced over the displacement (y-axis) and the cost function is non-convex. The course of the cost function 105 as displayed in FIG. 1 comprises two minimum, 106 and 107. One minimum 106 is the correct minimum and corresponds with the optimal displacement. The other minimum 107 is a false minimum, which may arise due to failures during the stitching process, like parallax errors, noise etc.

FIG. 2 illustrates partially an image stitching process according to an embodiment of the present invention. In comparison with FIG. 1, FIG. 2 shows a smaller overlapping area 203 of the first image 101 and the second image 102. A CNN 208 is used for processing the first image 101 and the second image 102 and for determining the cost function 205 in this image representation. Further, FIG. 2 illustrates the convex cost function 205, which should be reached for determining the optimum displacement at the minimum 206 of the cost function 205. In particular, FIG. 2 illustrates a schematic of a computer-implemented method for generating/computing an image representation based on image stitching with a convolutional neural network (CNN) as described with any one of the embodiments herein. The input data set may be comprised of the first image 101 and the second image 102. The input dataset 101, 102 may be processed using the CNN 208 using a method according to any one of the embodiments as described herein. The CNN 208 produces an output dataset comprising at least two images. Afterwards a stitching algorithm is applied to the output images of the CNN and an optimum displacement is determined. The optimum displacement at the minimum 206 of the cost function 205 for the two input images 101 and 102 is used for generating the composite image, i.e. the stitched image.

FIG. 3 illustrates a flow diagram illustrating method steps according to an embodiment of the invention. With the steps of FIG. 3, the training method steps are illustrated, wherein the steps may be performed in the order as described in FIG. 3. On the other hand, the order of the steps in FIG. 3 may not be limiting, hence the training method may be performed in a different order. Further, it may be possible to change the order of steps or to replace some steps or cancel some steps from the training method. In step S1 the image data may be received, wherein the image data comprises at least two images, overlapping each other in an overlapping area in which the images overlapping each other in a target anatomy, and wherein the overlapping area comprises an optimum displacement between the two images such that the two images can be correctly combined for image stitching. Step S1 may also be split into three steps for instance: S1*a* receiving input data, S1*b* processing image data by CNN, and S1*c* process image data. In step S2, the training method may determine a cost function of the displacement of the two images in the overlapping area. Then in step S3, a deviation of the cost function from a reference cost function may be determined. In step S5, the CNN is optimized based on the deviation. The method may further comprise the step S4, penalizing deviations from the reference cost function for determining the cost function which meets the reference cost function. Step S7 comprises the generation of the output, hence the processed input image data from the CNN, which is used for optimizing the CNN on the other hand step S7 may be used in the computer-implemented method as the output of the CNN for the stitching algorithm. In the training method in step S6 the other steps, starting with step S2 to step S5, may be repeated until the optimum displacement is determined, hence until the cost function meets the reference cost function. To the described method steps further method steps may be added, as for example wherein the step S2 of determining the cost function of the displacement of the two images comprises applying a similarity measure to a plurality of displacements between the two images. These steps could be further divided into sub steps, for example, the step of applying the similarity measure may comprise determining the similarity of the overlapping area for possible displacements, and/or the step of applying the similarity measure may comprise generating a cost value for each of the pluralities of displacements, wherein the cost function may be generated from the cost values of the plurality of displacements.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

LIST OF REFERENCE SIGNS

100 image representation
101 first image
102 second image
103, 203 displacement
104 target anatomy
105, 205 cost function
106, 206 minimum
107 false minimum
208 CNN
S1-S7 method steps

The invention claimed is:

1. A method of training a convolutional neural network (CNN) for determining an image representation for image stitching, the method comprising:

receiving image data, wherein the image data comprises at least two images, overlapping each other in an overlapping area in which the images overlap each other in a target anatomy, and wherein the overlapping area comprises an optimum displacement between the two images such that the two images can be correctly combined for image stitching;

determining a cost function of the displacement of the two images in the overlapping area;

determining a deviation of the cost function from a reference cost function; and, optimizing the CNN based on the deviation.

2. The method according to claim 1, further comprising penalizing deviations from the reference cost function.

3. The method according to claim 1, wherein determining the cost function, determining the deviation of the cost function from the reference cost function, and optimizing the CNN are repeated until the cost function meets the reference cost function.

4. The method of training according to claim 1, wherein the image data is obtained from clinical stitching sequences having annotated correct displacements and/or from artificially constructed image data with known displacement.

5. The method according to claim 1, wherein determining the cost function of the displacement of the two images comprises applying a similarity measure to a plurality of displacements between the two images.

6. The method according to claim 5, wherein applying the similarity measure comprises determining the similarity of the overlapping area for possible displacements.

7. The method according to claim 5, wherein applying the similarity measure comprises generating a cost value for each of the pluralities of displacements, wherein the cost function is generated from the cost values of the plurality of displacements.

8. The method according to claim 1, wherein the reference cost function is a convex cost function.

9. The method according to claim 1, wherein a minimum of the cost function corresponds to the optimum displacement of the two images.

10. The method according to claim 1, wherein the similarity measure comprises at least one of a normalized cross-correlation, a zero mean normalized cross-function, a sum of absolute differences, or a sum of squared differences.

11. A computer-implemented method for generating a stitched image with a convolutional neural network (CNN), comprising:

receiving an input dataset comprising at least two images, wherein the at least two images comprise an overlapping area in which the images overlap each other in a target anatomy;

processing the input dataset using the CNN trained using a method according to claim 1;

producing an output dataset from the CNN comprising at least two output images;

applying a stitching algorithm to the at least two output images of the CNN;

determining optimum displacement using the stitching algorithm; and generating a composite image, which is a stitched image, based on the determined optimum displacement and the input images.

12. The method according to claim 11, wherein processing the input data set comprises applying at least one trained filter kernel.

13. An image processing system for generating a stitched image with a convolutional neural network (CNN), the system comprising:

at least one processor configured to receive an input dataset comprising at least two images, wherein the at least two images comprise an overlapping area in which the images overlap each other in a target anatomy;

process the input dataset using the CNN trained using a method according to claim 1;

produce an output dataset from the CNN comprising at least two output images;

apply a stitching algorithm to the at least two output images of the CNN;

determine an optimum displacement using the stitching algorithm; and generate a composite image, which is a stitched image, based on the determined optimum displacement and the input images.

14. A non-transitory computer-readable medium comprising instructions which, when executed by a computer, cause the computer to carry out the method of claim 1.

* * * * *